US008085820B2

(12) United States Patent
Hara

(10) Patent No.: US 8,085,820 B2
(45) Date of Patent: Dec. 27, 2011

(54) DIGITAL BROADCAST SIGNAL MULTIPLEXING APPARATUS AND DIGITAL BROADCAST SIGNAL MULTIPLEXING METHOD

(75) Inventor: Keiichiro Hara, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1417 days.

(21) Appl. No.: 11/519,013

(22) Filed: Sep. 12, 2006

(65) Prior Publication Data

US 2007/0076793 A1 Apr. 5, 2007

(30) Foreign Application Priority Data

Sep. 14, 2005 (JP) ................................ 2005-266945

(51) Int. Cl.
*H04J 3/04* (2006.01)
*H04J 3/00* (2006.01)

(52) U.S. Cl. ......................... 370/535; 370/464; 370/498

(58) Field of Classification Search ................... 370/535
See application file for complete search history.

(56) References Cited

U.S. PATENT DOCUMENTS

2001/0015986 A1* 8/2001 Sugimoto et al. ............ 370/487
2002/0053078 A1* 5/2002 Holtz et al. .................... 725/14
2003/0007696 A1* 1/2003 Saito ............................ 382/239
2005/0141559 A1* 6/2005 Choi et al. .................... 370/469

FOREIGN PATENT DOCUMENTS

JP 2003-18599 1/2003

* cited by examiner

*Primary Examiner* — Ayaz Sheikh
*Assistant Examiner* — Tarell Hampton
(74) *Attorney, Agent, or Firm* — Finnegan, Henderson, Farabow, Garrett & Dunner, L.L.P.

(57) ABSTRACT

A digital broadcast signal multiplexing apparatus includes buffers store the number x of data X, a comparator determines a cumulative sum SX of the data X and a cumulative sum SA of the data A, and compares these cumulative sum SX and cumulative sum SA, a first processor sets the data A into $n^{th}$ data X, adds x to the cumulative sum SX when the cumulative sum SX is the cumulative sum SA, and adds a to the cumulative sum SA to determine whether or not data A is set into $n+1^{th}$ data X, and adds a to the cumulative sum SA to determine whether or not data A is set into $n+1^{th}$ data X when the cumulative sum SX is not the cumulative sum SA, a second processor causes the comparator and the first processor to repeatedly execute process until n is made to be x or more.

4 Claims, 4 Drawing Sheets

DIGITAL BROADCAST SIGNAL MULTIPLEXING APPARATUS AND DIGITAL BROADCAST SIGNAL MULTIPLEXING METHOD

CROSS-REFERENCE TO RELATED APPLICATIONS

This application is based upon and claims the benefit of priority from prior Japanese Patent Application No. 2005-266945, filed Sep. 14, 2005, the entire contents of which are incorporated herein by reference.

BACKGROUND OF THE INVENTION

1. Field of the Invention

The present invention relates to a digital broadcast signal multiplexing apparatus and a digital broadcast signal multiplexing method which multiplex respective transport stream (TS) data of video and audio used for a program, for example, in accordance with the Moving Picture Experts Group 2 (MPEG2) standard.

2. Description of the Related Art

In recent years, in terrestrial broadcasting systems, digital broadcasting has been started. In such digital broadcasting, respective TS data of video and audio used for a program are multiplexed and transmitted in a pattern determined in advance in accordance with the MPEG2 standard, and a broadcast program is made possible to view by demodulating the respective TS data to be synthesized and played back in appropriate timing at a receiving side. Moreover, a data broadcast program is made possible to display such that character and still image data are multiplexed onto TS data of a main program, and those are separated and demodulated, and are synthesized with video of the main program at the receiving side.

At a broadcasting station side, the above-described TS multiplexing is carried out by using a division system. In this case, there are some data A (the number: a) and some data X (the number: x, a≦x), and provided that data x are in one-dimensional domain, and when the data A are evenly distributed in the data X, a distribution density D of the data A in a unit domain of the data x, and a distance d of adjacent data A are expressed as follows.

$$D=a/x, d=x/a (a>0, x>0, a\leqq x)$$

When both "a" and "x" are positive integers, the distance d is not necessarily made an integer. Provided that the distance d is allowed to be only an integer, and when adjacent data A are distributed at a proximal integer f ($0\leqq f$, $|f-d|\leqq|f+1-d|$) serving as a distance d, a bias is brought about in the distribution more than a case in which the data A are distributed at the distance d.

Note that, conventionally, there is a technique as well in which, when rounding errors due to remainders are brought about, generation of rounding errors is reduced by variably setting a rounding coefficient (for example, refer to Jpn. Pat. Appln. KOKAI Publication No. 2003-18599).

However, even by the technique of reducing rounding errors, calculation is complicated, which results in an increase in processing load in the TS multiplexing processing.

BRIEF SUMMARY OF THE INVENTION

In light of the above circumstances, an object of the present invention is to provide a digital broadcast signal multiplexing apparatus and a digital broadcast signal multiplexing method which can efficiently generate digital broadcasting signals in which respective data are evenly distributed and multiplexed by simple calculations.

According to an aspect of the present invention, there is provided a digital broadcast signal multiplexing apparatus which multiplexes a total number a (a is an integer and a≦x) of data A into the number x (x is an integer) of data X to be transmitted as digital broadcast signals, the apparatus comprising: buffers which store the number x of data X; a comparator which determines a cumulative sum SX of the data X in the buffers and a cumulative sum SA of the data A given that initial values are 0, and compares these cumulative sum SX and cumulative sum SA; a first processor which sets the data A into $n^{th}$ (n is an integer) data X at that point in time, adds the number x to the cumulative sum SX, when the cumulative sum SX is the cumulative sum SA or less as a comparison result of the comparator, and adds the number a to the cumulative sum SA to determine whether or not data A is set into $n+1^{th}$ data X, and which adds the number a to the cumulative sum SA to determine whether or not data A is set into $n+1^{th}$ data X, when the cumulative sum SX is not the cumulative sum SA or less; and a second processor which determines whether or not n is made to be x or more, and causes the comparator and the first processor to repeatedly execute process until n is made to be x or more.

According to another aspect of the present invention, there is provided a digital broadcast signal multiplexing method which multiplexes a total number a (a is an integer, and a≦x) of data A into the number x (x is an integer) of data X to be transmitted as digital broadcast signals, the method comprising: a first step of comparing a cumulative sum SX of the data X and a cumulative sum SA of the data A given that initial values are 0; a second step of setting the data A into $n^{th}$ (n is an integer) data X at that point in time, adding x to the cumulative sum SX, and adding the number a to the cumulative sum SA to set n to n+1, when the cumulative sum SX is the cumulative sum SA or less as a comparison result in the first step, and adding the number a to the cumulative sum SA to set n to n+1, when the cumulative sum SX is not the cumulative sum SA or less; and a third step of determining whether or not n is made to be x or more, repeatedly executing process of the first step and the second step when n is not x or more, and terminating the process when n is x or more.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be described in detail with reference to the drawings.

First Embodiment

Figure 1:
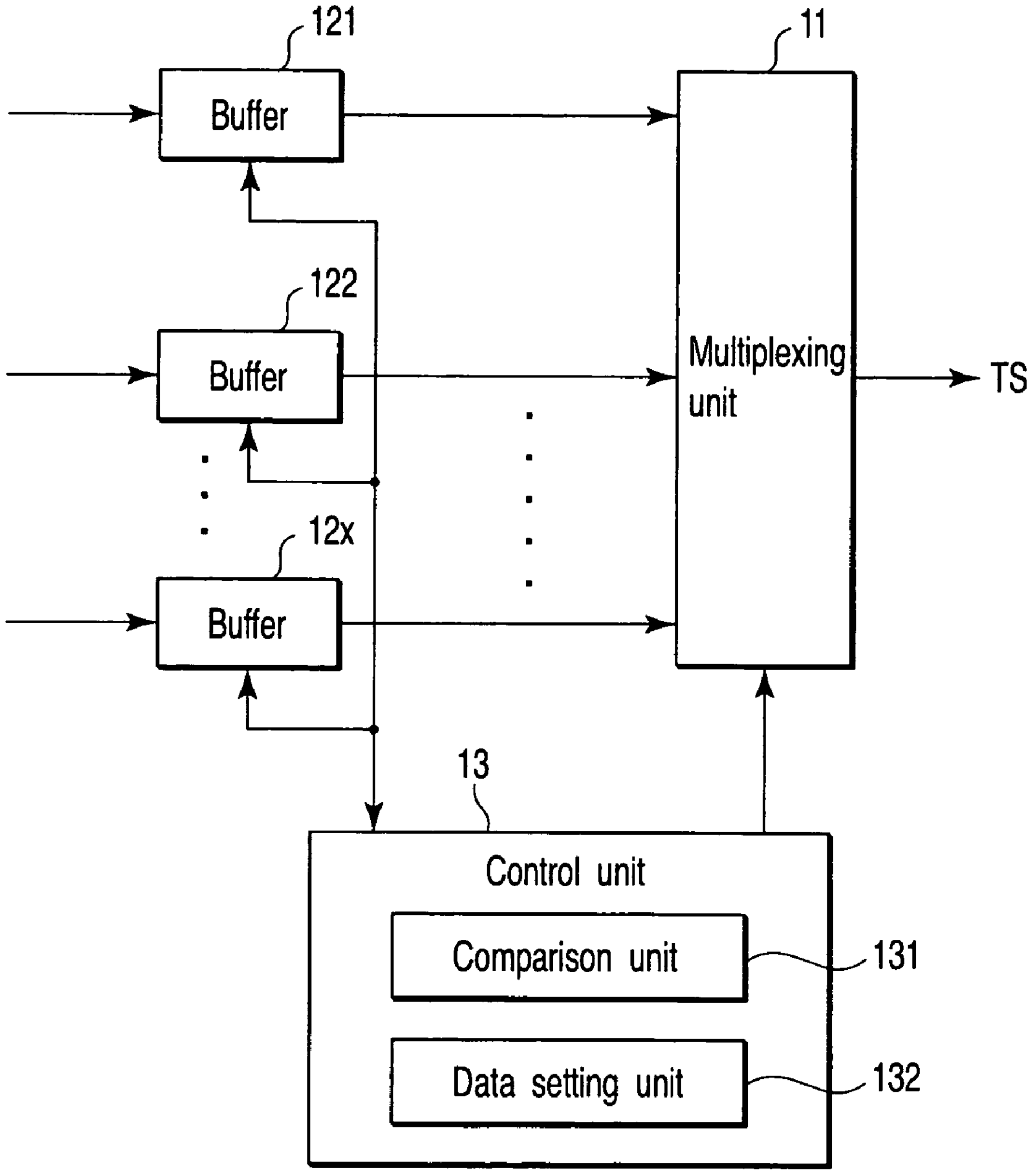
FIG. 1 is a block diagram showing a configuration of a first embodiment of a digital broadcast signal transmitting apparatus according to the present invention.

FIG. 1 is a block diagram showing a configuration of a first embodiment of a digital broadcast signal transmitting apparatus according to the present invention. In FIG. 1, reference numeral 11 is a multiplexing unit, which multiplexes TS data in accordance with the x-system MPEG2. A buffer 121 is connected to a $1^{st}$ input system of the multiplexing unit 11, a buffer 122 is connected to $2^{nd}$ input system, and a buffer 12*x* is connected up to an $x^{th}$ input system.

TS data of the $1^{st}$ system input is stored temporarily in the buffer 121, and is then supplied to the multiplexing unit 11. In the same way, TS data of $2^{nd}$ system input to $x^{th}$ system input are respectively stored in the buffers 122 to 12*x*, and then are supplied to the multiplex unit 11.

The multiplexing unit 11 is controlled to multiplex by a control unit 13, and selectively multiplexes outputs from the respective buffers 121 to 12*x* to transmit the outputs as TSs.

In this embodiment, a comparison unit 131 and a data setting unit 132 are provided at the control unit 13. The comparison unit 131 identifies respective data contents of TS data X in the respective buffers 121 to 12*x*, determines a cumulative sum SumX of the TS data X in the respective buffers 121 to 12*x* and a cumulative sum SumA of TS data A to be included in the TS data X given that initial values are 0, and compares these cumulative sum SumX and cumulative sum SumA.

When the cumulative sum SumX is the cumulative sum SumA or less as a comparison result by the comparison unit 131, the data setting unit 132 sets TS data A into $n^{th}$ (n is an integer) TS data X at that point in time, adds the x to the cumulative sum SumX, adds the number "a" of TS data A to be multiplexed to the cumulative sum SumA, and determines whether or not TS data A is set into $n+1^{th}$ TS data X. On the other hand, when the cumulative sum SumX is not the cumulative sum SumA or less, the data setting unit 132 adds "a" to the cumulative sum SumA, and determines whether or not data A is set into $n+1^{th}$ TS data X.

Figure 2:
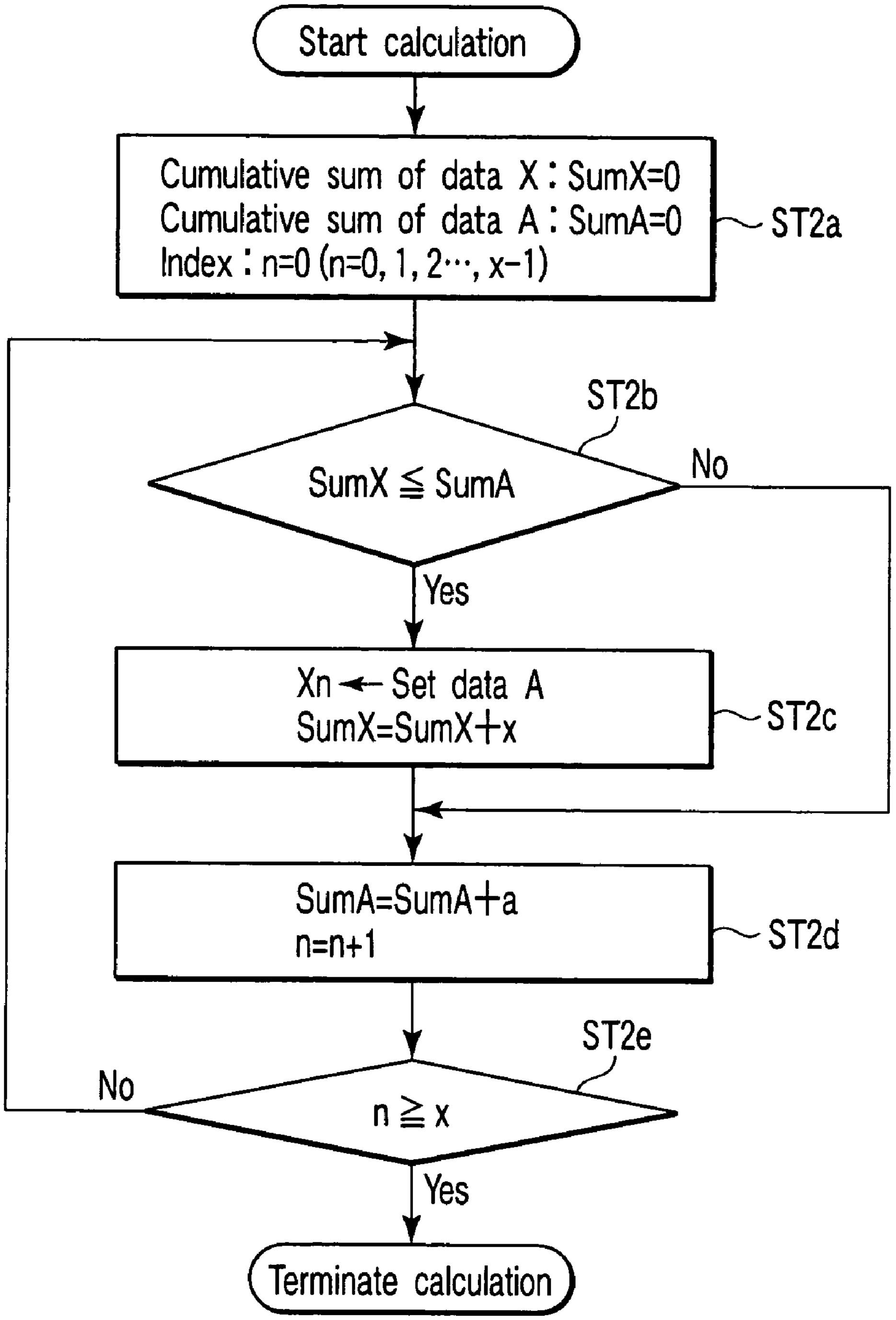
FIG. 2 is a flowchart showing multiple calculation processing procedures of a control unit shown in FIG. 1.

Next, in the above-described configuration, processing operations thereof will be described hereinafter. FIG. 2 is a flowchart showing multiple calculation processing procedures of the control unit 13.

Here, for example, it is supposed that the number x of TS data X is 10, TS data A are video data, and the number "a" thereof is 3.

First, the control unit 13 sets an initial value of the cumulative sum SumX of TS data X in the respective buffers 121 to 12*x* to 0, sets an initial value of the cumulative sum SumA of TS data A to 0, and sets n to 0 (step ST2*a*). Then, it is determined whether or not the cumulative sum SumA is the cumulative sum SumX or more by comparing the cumulative sum SumX and the cumulative sum SumA (step ST2*b*). Here, because the cumulative sum SumX=0, and the cumulative sum SumA=0, the control unit 13 proceeds from step ST2*b* to step ST2*c* where the control unit 13 sets video data at a point X0 in the TS data X, sets so as to be the cumulative sum SumX=10, and sets so as to be cumulative sum SumA=3 and n=1 (step ST2*d*).

Next, the control unit 13 determines whether or not n is x or more (step ST2*e*). Here, because n=1 and x=10, n is not x or more. For this reason, the control unit 13 proceeds to the processing in step ST2*b*. Here, the control unit 13 determines whether or not the cumulative sum SumA is the cumulative sum SumX or more. However, because SumA=3 and SumX=10, the control unit 13 proceeds to step ST2*d* from step ST2*b* where the control unit 13 sets so as to be SumA=6 and n=2. Therefore, video data is not set at a point X1 in the TS data X.

Thereafter, the control unit 13 repeatedly executes the process in step ST2*b* to step ST2*e* until n is made to be x or more, terminates the calculation processing at a point when n is made to be x or more, and informs the multiplexing unit 11 of multiplexed pattern information.

Figure 3:
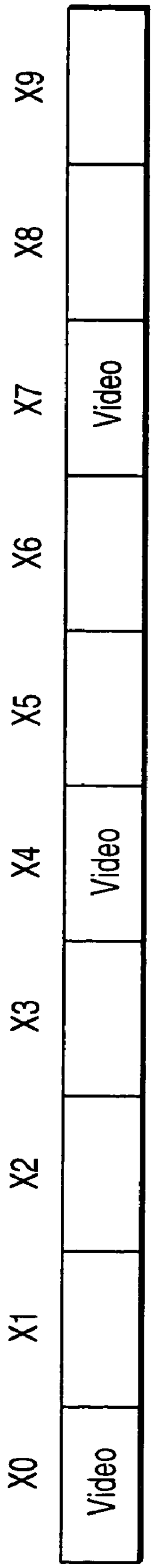
FIG. 3 is a diagram showing a structure of a TS generated by the multiple calculation processing procedures shown in FIG. 2.

Then, the multiplexing unit 11 generates a TS of the multiplexed pattern shown in FIG. 3, and transmits it. In the TS, video data are multiplexed at points X0, X4, and X7. Further, when four, seven, or eight video data are multiplexed, these can be multiplexed so as to be efficiently distributed by the above-described calculation procedures.

As described above, in the present embodiment, in a case where the number "a" of TS data A is included in the number x of TS data X stored in the buffers 121 to 12*x* in the control unit 13, a cumulative sum SumX of the TS data x in the buffers 121 to 12*x* and a cumulative sum SumA of the TS data A are determined given that initial values are 0. Then, It is determined whether or not TS data A is set into an $n^{th}$ TS data X by comparing these cumulative sum SumX and cumulative sum SumA. Then, when TS data A is set into the $n^{th}$ TS data X, x is added to the cumulative sum SumX, and "a" is added to the cumulative sum SumA, it is repeatedly determined whether or not TS data A is set into the $n+1^{th}$ TS data X until n is made to be x or more. Further, when TS data A is not set into the $n^{th}$ TS data X, "a" is added to the cumulative sum SumA, and it is determined whether or not TS data A is set into the $n+1^{th}$ TS data X.

Accordingly, it is possible to determine whether or not TS data A are set into the number x of TS data X by addition processings. As a consequence, there are no limitations to the number of TS data A, the number of TS data X, and a distance d as in a case of division processing. Moreover, rounding errors are not brought about, which makes it possible to efficiently generate highly-precise TSs in which respective TS data are evenly distributed and multiplexed, and to be compliant with the MPEG2-TS standard as well.

Second Embodiment

Figure 4:
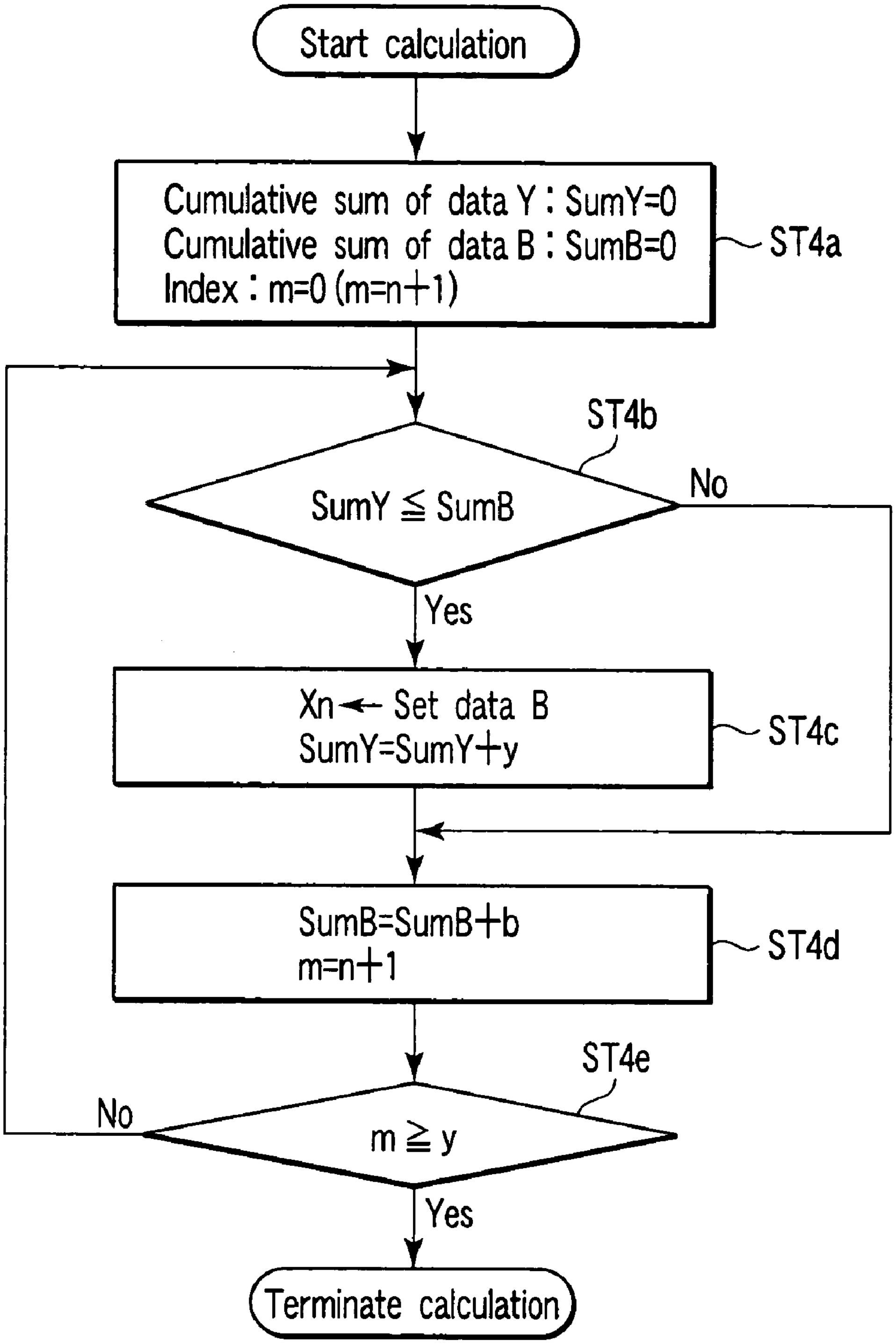
FIG. 4 is a flowchart showing multiple calculation processing procedures of the control unit when audio data are inserted into a TS into which video data have been inserted in a second embodiment of the present invention.

FIG. 4 is a flowchart showing multiple calculation processing procedures of the control unit 13 when audio data are inserted into a TS into which video data have been multiplexed, as a second embodiment of the present invention.

Here, it is supposed that the number y of TS data Y into which video data are not inserted is 7, TS data B are audio data, and the number b thereof is 4.

First, the control unit 13 sets an initial value of a cumulative sum SumY of the TS data Y in the respective buffers 121 to 12*x* to 0, sets an initial value of a cumulative sum SumB of the TS data B to 0, and sets m (m=n+1) to 0 (step ST4*a*). Then, it is determined whether or not the cumulative sum SumB is the cumulative sum SumY or more by comparing the cumulative sum SumY and the cumulative sum SumB (step ST4*b*). Here, because the cumulative sum SumY=0, and the cumulative sum SumB=0, the control unit 13 proceeds to step ST4*c* from step ST4*b* where the control unit 13 sets audio data at a point Y0 in the TS data Y, sets so as to be the cumulative sum SumY=7, and sets so as to be the cumulative sum SumB=4 and m=1 (step ST4*d*).

Next, the control unit 13 determines whether or not m is y or more (step ST4*e*). Here, because m=1 and y=7, m is not y or less. For this reason, the control unit 13 proceeds to processing in step ST4*b*. Here, the control unit 13 determines whether or not the cumulative sum SumB is the cumulative sum SumY or more. However, because SumB=4 and SumY=7, the control unit 13 proceeds to step ST4*d* from step ST4*b* where the control unit sets so as to be SumA=8 and m=2. Therefore, audio data is not set at a point Y1 in the TS data Y.

Thereafter, the control unit 13 repeatedly executes the process in step ST4*b* to step ST4*e* until m is made to be y or more, terminates the calculation processing in a point when m is made to be y or more, and informs the multiplexing unit 11 of multiplexed pattern information.

Figure 5:
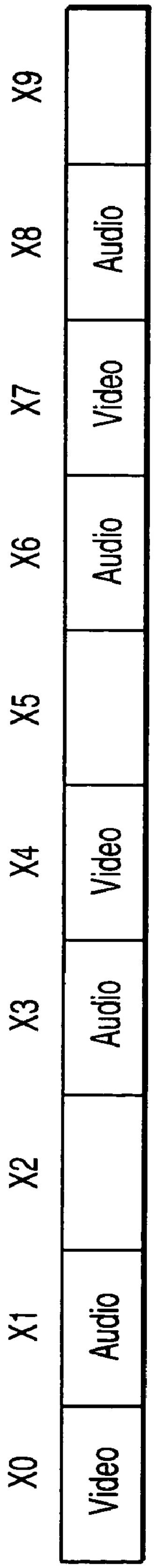
FIG. 5 is a diagram showing a structure of a TS generated by the multiple calculation processing procedures shown in FIG. 4.

Then, the multiplexing unit 11 generates a TS of the multiplexed pattern shown in FIG. 5 so as to be synthesized with the TS data into which video data have been inserted, and transmits it. In the TS, audio data are multiplexed at points X1, X3, X6, and X8. Further, when three or five audio data are multiplexed, these can be multiplexed so as to be efficiently distributed by the above-described calculation procedures.

Other Embodiments

Note that the present invention is not limited to the above-described respective embodiments. In the respective embodiments, an example has been described in which the multiplexing unit 11 and the control unit 13 are separately provided. However, the present invention may be structured such that the control unit 13 is built into the multiplexing unit 11.

Further, in addition thereto, a case of handling digital broadcast signals regulated by others than the configuration of the digital broadcast signal multiplexing apparatus and the MPEG2 encoding system as well can be variously modified and implemented within a range which does not depart from the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital broadcast signal multiplexing apparatus, which multiplexes a total number a (a is an integer of 0 or more and a≦x) of data A into a number x (x is an integer of 0 or more) of data X to be transmitted as digital broadcast signals, the apparatus comprising:

buffers which store the number x of data X;

a comparator, which:

determines a cumulative sum SX of the data X in the buffers and a cumulative sum SA of the data A, wherein the cumulative sum SX and the cumulative sum SA both have initial values of 0, and compares the cumulative sum SX with the cumulative sum SA;

a first processor, which:

when a comparison result by the comparator is that the cumulative sum SX is less than or equal to the cumulative sum SA:

sets the data A into $n^{th}$ (n is an integer of 0 or more) data X, wherein n is initialized as less than x, and adds x to the cumulative sum SX, and when the comparison result by the comparator is that the cumulative sum SX is not less than or equal to the cumulative sum SA:

adds the number a to the cumulative sum SA, and increments n to n+1; and a second processor, which determines whether or not n is greater than or equal to x, and causes the comparator and the first processor to repeatedly execute until n is greater than or equal to x; and wherein the digital broadcast signal multiplexing apparatus is configured to transmit the number of x of the data X.

2. The digital broadcast signal multiplexing apparatus according to claim 1, wherein the comparator determines:

a cumulative sum SY of a number y (y is an integer of 0 or more) of data Y, which is the cumulative sum SA of the data A subtracted from the cumulative sum SX of the data X in the buffers, and a cumulative sum SB of a number b of data B, different from the data A;

wherein the comparator compares the cumulative sum SY with the cumulative sum SB, when a comparison result of the comparator is that the cumulative sum SY is less than or equal to the cumulative sum SB, the first processor sets the data B into $m^{th}$ (m is an integer of 0 or more) data Y, adds y to the cumulative sum SY, adds the number b to the cumulative sum SB, and increments m to m+1, and when the comparison result of the comparator is that the cumulative sum SY is not less than or equal to the cumulative sum SB, the first processor adds the number b to the cumulative sum SB, and increments m to m+1, and the second processor determines whether or not m is greater than or equal to y, and causes the comparator and the first processor to repeatedly execute until m is greater than or equal to y.

3. A digital broadcast signal multiplexing method which multiplexes a total number a (a is an integer of 0 or more, and a≦x) of data A into a number x (x is an integer of 0 or more) of data X to be transmitted as digital broadcast signals, the method comprising:

comparing a cumulative sum SX of the data X with a cumulative sum SA of the data A, wherein the cumulative sum SX and the cumulative sum SA both have initial values of 0;

setting the data A into $n^{th}$ (n is an integer of 0 or more) data X, wherein n is initialized as less than x, adding x to the cumulative sum SX, adding the number a to the cumulative sum SA, and incrementing n to n+1, when the cumulative sum SX is less than or equal to the cumulative sum SA;

adding the number a to the cumulative sum SA and incrementing n to n+1, when the cumulative sum SX is not less than or equal to the cumulative sum SA; and determining whether or not n is greater than or equal to x; and repeatedly executing the comparing, the setting and the adding when n is not greater than or equal to x, and terminating the process when n is greater than or equal to x; and transmitting the number of x of the data X.

4. The digital broadcast signal multiplexing method according to claim 3, further comprising:

determining a cumulative sum SY of a number y (y is an integer of 0 or more) of data Y as the cumulative sum of the data A subtracted from the cumulative sum SX of the data X in the buffers;

determining a cumulative sum SB of a number b of data B, different from the data A;

comparing the cumulative sum SY with the cumulative sum SB;

when the cumulative sum SY is less than or equal to the cumulative sum SB, setting the data B into $m^{th}$ (m is an integer of 0 or more) data Y, adding y to the cumulative sum SY, adding the number b to the cumulative sum SB, and incrementing m to m+1;

when the cumulative sum SY is not less than or equal to the cumulative sum SB, adding the number b to the cumulative sum SB and incrementing m to m+1; and determining whether or not m is greater than or equal to y, and repeatedly executing: comparing SY with SB, the associated setting, adding, and incrementing when SY is less than or equal to SB, and the associated adding and incrementing when SY is not less than or equal to SB, when m is not greater than or equal to y, and terminates the process when m is greater than or equal to y.

* * * * *

UNITED STATES PATENT AND TRADEMARK OFFICE

CERTIFICATE OF CORRECTION

PATENT NO. : 8,085,820 B2
APPLICATION NO. : 11/519013
DATED : December 27, 2011
INVENTOR(S) : Hara It is certified that error appears in the above-identified patent and that said Letters Patent is hereby corrected as shown below:

Claim 3, column 6, line 65, delete “and”.

Claim 3, column 6, line 67, delete “and”.

Signed and Sealed this
Tenth Day of April, 2012

David J. Kappos
*Director of the United States Patent and Trademark Office*